United States Patent [19]
Brown

[11] 3,733,828
[45] May 22, 1973

[54] ROCKET CHAMBER AND INJECTOR SEGMENTATION AND SUPERSONIC BAFFLES

[75] Inventor: Donald G. Brown, Canoga Park, Calif.

[73] Assignee: The United States of America as represented by the Secretary of the Air Force, Washington, D.C.

[22] Filed: Apr. 6, 1972

[21] Appl. No.: 241,570

[52] U.S. Cl. ................................. 60/258, 60/271
[51] Int. Cl. .......................... F02k 9/02, B05b 1/06
[58] Field of Search ..................... 60/271, 257, 258, 60/39.74 A, 224, 225, 229, 263

[56] References Cited

UNITED STATES PATENTS

| | | | |
|---|---|---|---|
| 3,112,611 | 12/1963 | Adamson | 60/39.74 A |
| 3,112,612 | 12/1963 | Adamson et al. | 60/39.74 A |
| 3,270,501 | 9/1966 | Webb | 60/271 |
| 3,615,054 | 10/1971 | Botz | 60/258 |

Primary Examiner—Carlton R. Croyle
Assistant Examiner—Robert E. Garrett
Attorney—Harry A. Herbert, Jr. et al.

[57] ABSTRACT

The conventional thrust chamber and injector assembly of a liquid propellant rocket engine are manufactured by removably connecting together a plurality of identical arcuate segments thereof, with each segment having an identical baffle plate at each of the two ends of the segment. The identical arcuate segments, together with the identical baffle plates, collectively form the toroidal thrust chamber and injector assembly. The segmentation accelerates manufacture of the assembly and permits easy and rapid removal and replacement of any of the segments. The baffle plates extend beyond the throat of the thrust chamber and into the supersonic region in the nozzle area and, thereby, provide circumferential stability of the rocket motor.

2 Claims, 4 Drawing Figures

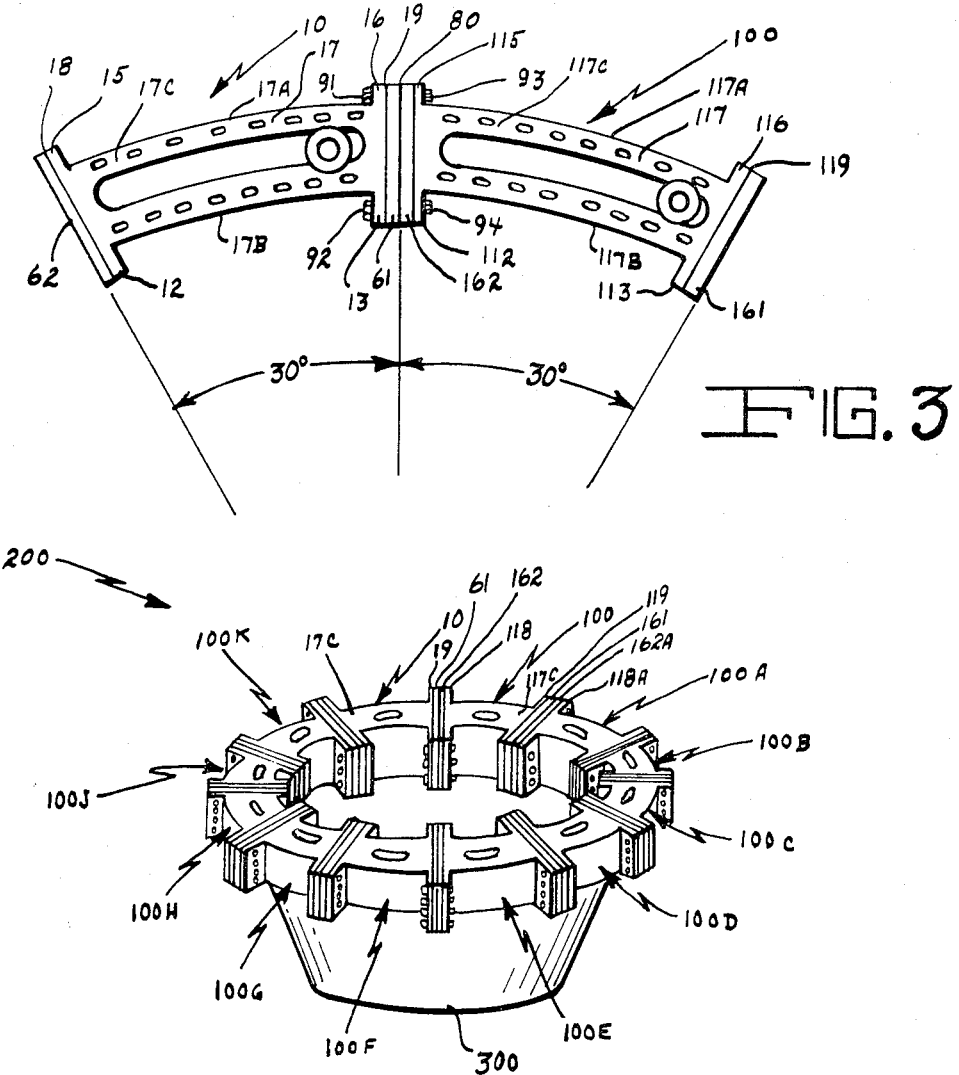

ROCKET CHAMBER AND INJECTOR SEGMENTATION AND SUPERSONIC BAFFLES

BACKGROUND OF THE INVENTION

This invention relates to a liquid propellant rocket engine and, more particularly, to the thrust chamber and injector assembly thereof. It is to be noted that, in the interest of simplicity, the term "injector," as used herein is intended to include the injector manifold or, more accurately, the liquid propellant manifold.

Liquid propellant rocket engines may be classified in accordance with the type of nozzle which is a component thereof. The type of nozzles include the cone type, the bell type, and the annular type. In turn, there are two basic types of annular nozzles: the radial in-flow type (also referred to as the "spike" nozzle) and the radial out-flow type. An improved version of the spike type annular nozzle is the aerodynamic spike nozzle, commonly referred to as an "aerospike nozzle." The aerospike nozzle is, in effect, a truncated annular spike nozzle.

The aerospike nozzle specifically, and the spike type annular nozzle generally, is attractive for space vehicle application, because shortened nozzles reduce interstage structure weight and permit an increase in payload through increased performance for a given length. As a result, liquid propellant rocket engines having an aerospike nozzle are being manufactured as current state-of-the-art rocket motors.

An aerospike nozzle rocket motor, unlike a cone or bell nozzle rocket engine, has a torus-like or circumferential thrust chamber and injector assembly, commonly referred to as being "toroidal," aft or forward of the aerospike nozzle. It is here emphasized that this invention is concerned with such a toroidal thrust chamber and injector assembly, and not with the aerospike nozzle which hereinafter will be referred to as the "aerospike nozzle extension" to avoid confusion.

The current state-of-the-art is that the conventional toroidal thrust chamber and injector assembly is manufactured as, and is comprised essentially of, three major components integrated into one unit. These major components are an inner vertical ring, an outer concentric vertical ring, and an injector shaped substantially in the form of an annulus which is positioned on the top surface of, and is joined to, the two concentric vertical rings. The inner surface of the outer concentric ring and the outer surface of the inner concentric ring are configurated and constructed so that they form and define a circumferential or toroidal thrust chamber which, from the injector downward, sequentially includes a combustion chamber, a throat, and a nozzle area. The nozzle area does not include the aerospike nozzle extension referred to above.

The region in the toroidal thrust chamber upstream from the throat (i.e., in or near the combustion chamber) is known as, and is, the subsonic region of gaseous flow. The region in the toroidal thrust chamber downstream from the throat (i.e., in or near the nozzle area) is known as, and is, the supersonic region of gaseous flow. The manufacture of the conventional toroidal thrust chamber and injector assembly is completed by disposing baffle plates at regularly spaced intervals within the thrust chamber. The baffles are identical and each baffle extends from the bottom surface of the injector to the subsonic region upstream of the throat.

This present state-of-the-art toroidal thrust chamber and injector assembly suffers from distinct and severe disadvantages. Some of the disadvantages are as follows: firstly, the manufacture of the assembly as one entire integrated unit is inordinately time-consuming; secondly, the entire assembly must be manufactured before it can be tested; thirdly, should the manufactured assembly be defective only in part, nevertheless the entire assembly must be discarded and another entire assembly must be manufactured and used; fourthly, essential and critical tolerances are, at best, difficult to maintain throughout the entire length of the toroidal thrust chamber; and, fifthly, toroidal type thrust chambers exhibit undesired and detrimental circumferential modes of instability which, at the very least, have some adverse affect upon the operation of the rocket engine as a whole.

I have invented a novel segmented toroidal thrust chamber and injector assembly, and a method of manufacturing it, which eliminates these disadvantages and difficulties and, thereby, constitutes a significant advance in the state-of-the-art.

SUMMARY OF THE INVENTION

This invention pertains to a segmented conventional toroidal thrust chamber and injector assembly of a liquid propellant liquid rocket engine and, in addition, to a method of manufacturing such an assembly.

An object of this invention is to permit the manufacture of a toroidal thrust chamber and injector assembly in significantly less time than is presently required to manufacture such an assembly.

Another object of this invention is to permit testing of individual portions (i.e., segments) of a toroidal thrust chamber and injector assembly, rather than having to wait until the entire assembly is completed.

Still another object of this invention is to permit the easy and rapid removal and replacement of any defective or damaged portion of the toroidal thrust chamber and injector assembly, instead of having to replace the entire assembly.

A further object of this invention is to permit the maintenance, with relative ease, of essential and critical tolerances throughout the entire length of the toroidal thrust chamber.

A still further object of this invention is to prevent and eliminate the undesired and detrimental circumferential modes of instability exhibited by present state-of-the-art toroidal thrust chambers and, thereby, provide circumferential stability.

These objects, and other equally important and related objects, of this invention will become readily apparent after a consideration of the description of the invention and reference to the drawings.

DESCRIPTION OF THE DRAWINGS

FIG. 3 is a top plan view, in simplified schematic form, of two of the identical arcuate segments of my invention, with each segment having an identical baffle plate at each of the two ends thereof, and with the Figure showing how one segment with the baffle plates is removably connected end-to-end to the next adjacent segment which also has baffle plates; and FIG. 4 is a front elevation view, in perspective and in simplified schematic form, showing how the plurality of identical arcuate segments of my invention, with each segment having a baffle plate at each end, are removably connected together to form the toroidal thrust chamber and nozzle assembly of a liquid propellant rocket motor. Also shown is the aerospike nozzle extension and its positional relationship when attached to the toroidal thrust chamber and nozzle assembly.

DESCRIPTION OF THE PREFERRED EMBODIMENT

Figure 1:
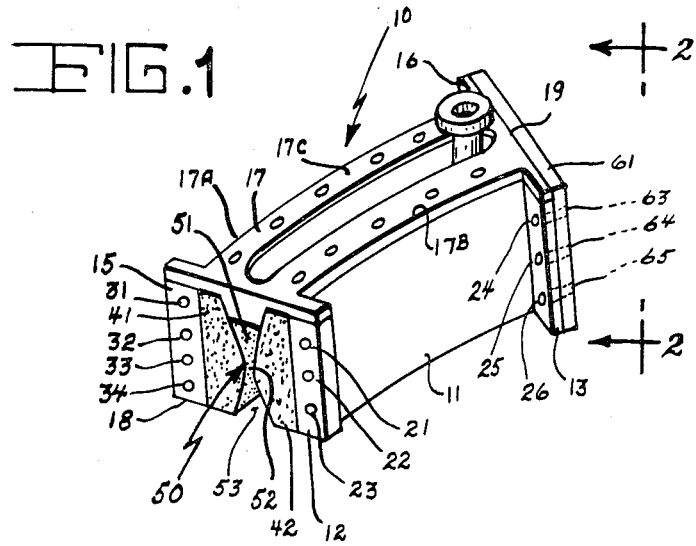
FIG. 1 is a front elevation view, in perspective and in simplified schematic form, of a preferred embodiment of one of the plurality of identical arcuate segments of my invention, with a baffle plate at only one of the two ends of the segment in the interest of maintaining simplicity of the drawing.

With reference to FIG. 1, therein is shown, in a front elevation view, in perspective, and in simplified schematic form, a representative arcuate segment 10 of the plurality of identical arcuate segments which comprise the major components of my invention, a segmented toroidal thrust chamber and injector assembly of and for a liquid propellant rocket engine. The term "segment" as used herein is intended to mean a portion, or a section, or one of the constituent parts, and the like.

The representative arcuate segment 10 shown in FIG. 1 is, in effect, a segment of a conventional toroidal thrust chamber and injector assembly of a liquid propellant rocket engine and includes: inner vertically disposed wall 11 with flange 12 at one end and flange 13 at the other end; outer vertically disposed wall (not shown in FIG. 1) with flange 15 at one end and flange 16 at the other end; and horizontally disposed injector portion 17 joined to the top surface of the inner wall 11 and to the flanges 12 and 13 thereof, and also joined to the top surface of the outer wall and to the flanges 15 and 16 thereof, thereby integrating said walls, said flanges, and said injector portion to form a single unitary segment, such as 10. It is here emphasized that segment 10, except for the flanges, is in effect a segment of a conventional toroidal thrust chamber and injector assembly. It is reiterated that arcuate segment 10 is one of a plurality of identical arcuate segments which, in part, comprise my invention.

Again with reference to FIG. 1, each identical segment, such as 10, has a first vertical end, such as 18, and a second vertical end, such as 19. Flanges 12 and 13 have a plurality of horizontally disposed vertically aligned apertures, preferably three each, such as 21, 22 and 23, and 24, 25 and 26. Flanges 15 and 16 also have a plurality of horizontally disposed vertically aligned apertures, preferably four each, such as 31–34, inclusive. Inner vertically disposed wall 11 and the outer vertically disposed wall are arcs of concentric circles. Horizontally disposed injector portion 17 has edges, 17A and 17B, which are arcs of the same concentric circles, and which are of the same arc length, as those arcs which define wall 11 and the outer wall. In effect, the upper surface 17C of horizontally disposed injector portion 17 is a part of an annulus and, therefore, hereinafter will be referred to as "the upper annular-like surface" or the like. The inner surface 41 of the outer wall and the outer surface 42 of the inner wall 11 are configured to form and define a toroidal thrust chamber 50 which includes, in a downward direction, a combustion chamber 51, a throat 52, and a nozzle area 53. Thrust chamber 50, which is conventional, extends from first vertical end 18 of segment 10 to second vertical end 19 of segment 10.

Still with reference to FIG. 1, a baffle plate, such as 61, is affixed by suitable means, such as by brazing, to each vertical end, such as 18 and 19, of each identical arcuate segment, such as 10. Each baffle plate, such as 61, extends at least from the top of the combustion chamber 51 (i.e., the bottom surface of injector portion 17) downwardly beyond the throat 52 and into the nozzle area 53. As a matter of convenience, each baffle plate, such as 61, actually extends from the upper annular-like surface 17C of injector portion 17, as shown in FIG. 1. The region upstream of the throat 52 (i.e., in or near combustion chamber 51) is the subsonic region of gaseous flow, and the region downstream of the throat 52 (i.e., in or near nozzle area 53) is the supersonic region of gaseous flow. Each baffle plate, such as 61, therefore extends downwardly into the supersonic region. This is not the length of baffle plates used in the conventional toroidal thrust chamber. The baffle plates which are conventionally used extend downwardly only to and into the subsonic region of gaseous flow where they terminate. Each baffle plate, such as 61, used in my invention has a plurality of horizontally disposed vertically aligned apertures, such as 63–65 inclusive, of the same number, of the same size, and in registration with the apertures in the flanges, such as 13 and 16, which it abuts. Additionally, all baffle plates, such as 61, which comprise a component of my invention are identical. As a related matter, it is here to be noted that the terms "segment," "arcuate segment," "representative segment," and the like, when used herein, are not intended to include, as a component thereof, any baffle plate, such as 61.

Figure 2:
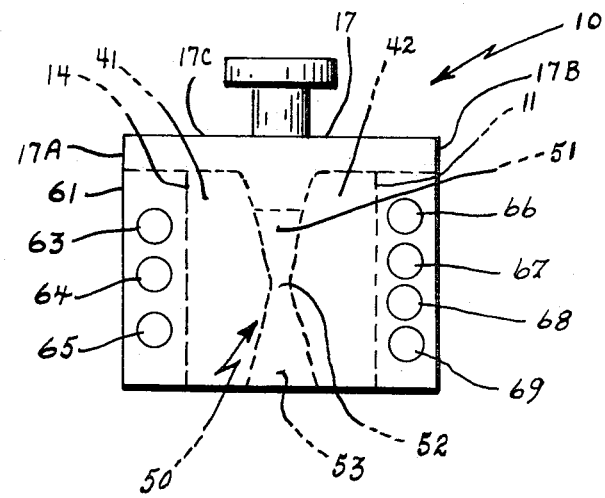
FIG. 2 is a side elevation view, in simplified schematic form, of the representative arcuate segment and baffle plate shown in FIG. 1, taken in the direction of line 2—2 of FIG. 1.

With reference to FIG. 2, therein is shown a side elevation view, in simplified schematic form, of the representative arcuate segment 10 and baffle plate 61 shown in FIG. 1, facing in the direction of line 2—2 of FIG. 1. More specifically, shown are: inner vertically disposed wall 11 with outer surface 42; outer vertically disposed wall 14 with inner surface 41; horizontally disposed injector portion 17 with annular-like upper surface 17C and edges 17A and 17B; thrust chamber 50 with combustion chamber 51, throat 52, and nozzle area 53; and baffle plate 61 with apertures 63–65 inclusive and 66–69 inclusive. As can be readily seen, baffle plate 61, which is representative of the plurality of identical baffle plates that comprise a component of my invention, extends downwardly from upper annular-like top surface 17C of injector portion 17 (i.e., above combustion chamber 51) to the exit portion of nozzle area 53 (i.e., the supersonic region of gaseous flow). Although baffle plate 61 is shown extending downwardly to the exit portion of nozzle 53, FIGS. 1 and 2, the baffle plate need only extend downstream of the throat 52 and into the nozzle area 53.

With reference to FIG. 3, therein is shown a top plan view, in simplified schematic form, of two of the plurality of identical arcuate segments, with end baffle plates affixed thereto, which comprise part of my segmented toroidal thrust chamber and injector assembly. Shown are arcuate segment 10 and next adjacent identical arcuate segment 100. Also shown is how adjacent identical arcuate segments, such as 10 and 100, with end baffle plates attached thereto, are removably connected end-to-end at the interface, such as 80, of the baffle plates 61 and 162, while maintaining the coplanar relationship of the respective upper annular-like surfaces, such as 17C and 117C, of the adjacent identical arcuate segments. Segment 10 has: horizontally disposed injector portion 17 with upper annularlike surface 17C and edges 17A and 17B; inner wall flanges 12 and 13 with apertures therein (not shown); outer wall flanges 15 and 16 with apertures therein (not shown); and first vertical end 18 and second vertical end 19. At first vertical end 18 is affixed baffle plate 62 with apertures therein (not shown) registering with the apertures of flanges 12 and 15. At second vertical end 19 is affixed baffle plate 61 with apertures therein (not shown) registering with the apertures of flanges 13 and 16. Arcuate segment 100 is identical to segment 10 and, as shown in FIG. 3, has: horizontally disposed injector portion 117 with upper annular-like surface 117C and edges 117A and 117B; inner wall flanges 112 and 113 with apertures therein (not shown); outer wall flanges 115 and 116 with apertures therein (not shown); and first vertical end 118 and second vertical end 119. At first vertical end 118 is affixed baffle plate 162 with apertures therein (not shown) registering with the apertures of flanges 112 and 115, and with the apertures of baffle plate 61 of segment 10. At second vertical end 119 is affixed baffle plate 161 with apertures therein (not shown) registering with the apertures of flanges 113 and 116.

Still with reference to FIG. 3, arcuate segment 10 and identical next adjacent arcuate segment 100 are removably connected baffle plate end-to-baffle plate end, hereinafter referred to as end-to-end, by suitable means. As shown in FIG. 3, a suitable means for removably connecting arcuate segment 10, with end baffle plates 62 and 61, to next adjacent identical arcuate segment 100, with end baffle plates 162 and 161, comprises a plurality of bolts, such as 91 and 92, with associated nuts, such as 93 and 94, respectively attached thereto. More particularly, bolt 91 passes through one set of the four sets of aligned apertures in flange 16 and baffle plate 61 at the second vertical end 19 of segment 10, and in baffle plate 162 and in flange 115 at the first vertical end 118 of next adjacent segment 100. Nut 93 is removably fitted on the end of bolt 91. A bolt and nut similar to bolt 91 and nut 93 are used with regard to each of the other three sets of aligned apertures in flange 16, baffle plate 61, baffle plate 162, and flange 115. Bolt 92 passes through one set of the three sets of aligned apertures in flange 13 and baffle plate 61 at the second vertical end 19 of segment 10, and in baffle plate 162 and in flange 112 at the first vertical end 118 of segment 100. Nut 94 is removably fitted on the end of bolt 92. A bolt and nut similar to bolt 92 and nut 94 are used with regard to each of the other two sets of aligned apertures in flange 13, baffle plate 61, baffle plate 161, and flange 112. Similarly, each next adjacent identical arcuate segment, with end baffle plates, is removably connected to the preceding adjacent identical arcuate segment, with end baffle plates, until the entire circular-like 360° toroidal thrust chamber and injector assembly is formed. Although the bolt-and-nut type of removable connecting means is used herein, this is solely by way of illustration and not by way of any limitation. Obviously, any suitable means for removably connecting adjacent identical arcuate segments end-to-end (i.e., baffle plate end-to-baffle plate end) may be used to form the complete toroidal thrust chamber and injector assembly.

Again with reference to FIG. 3, it is to be noted that each of the identical arcuate segments 10 and 100, with end baffle plates affixed thereto, subtends an angle of 30°. (Each of the angles is in schematic form, and in the interest of maintaining clarity of the drawing, is not exactly 30°. The length of the arc from the outer surface of baffle plate 62 to the outer surface of baffle plate 61 is 30°, and the length of the arc from the outer surface of baffle plate 162 to the outer surface of baffle plate 161 is 30°. This arc length is also by way of illustration only and not by way of any limitation. This arc length has been found convenient, so that my completely formed toroidal thrust chamber and injector assembly in this case would comprise 12, 30° identical adjacent arcuate segments, with end baffle plates affixed thereto, which are removably connected end-to-end. Obviously, my 360° segmented toroidal thrust chamber and injector assembly could, for example, be comprised of 24, 15° identical adjacent arcuate segments, with end baffle plates affixed thereto, which are removably connected end-to-end.

With reference to FIG. 4, therein is shown a front elevation view, in perspective and in simplified schematic form, of the completely formed 360° toroidal thrust chamber and injector assembly 200 attached to aerospike nozzle extension 300. As a matter of preference, the assembly 200 comprises 12 identical adjacent arcuate segments 10, 100, 100A, 100B, 100C, 100D, 100E, 100F, 100G, 100H, 100J, and 100K, which, together with their respective end plates, individually each form an arc of 30°. Each identical adjacent arcuate segment, with end baffle plates affixed thereto, is removably connected by suitable means to the next identical adjacent arcuate segment, with end baffle plates affixed thereto, in an end-to-end fashion. In that manner, the second vertical end 19 of segment 10, with end baffle plate 61, is removably connected to the first vertical end 118 of the next adjacent identical segment 100, with end baffle plate 162, and second vertical end 119 of segment 100, with end baffle plate 161, is removably connected to the first vertical end 118A of the next adjacent identical segment 100A, with end baffle plate 162, and so forth, until the entire 360° toroidal thrust chamber and injector assembly 200 is formed. Coplanar relationship of the upper annular-like surface of each adjacent identical arcuate segment, such as surface 17C of segment 10 and surface 117C of segment 100, is maintained.

In view of the foregoing, it is clear that my toroidal thrust chamber and injector assembly 200 significantly differs structurally from the conventional toroidal thrust chamber and injector assembly in three respects. Firstly, my assembly is segmented, while the conventional assembly is not. Secondly, each of the plurality of identical adjacent arcuate segments is removably connected and, of course, may be individually and separately removed from the assembly 200. Thirdly, my baffle plates extend into the supersonic region of gaseous flow in the thrust chamber, while the baffle plates of the conventional assembly extend only into the subsonic region. As will be explained later, these differences produce new, useful, unexpected and unobvious results.

DESCRIPTION OF THE INVENTIVE METHOD

With regard to my inventive method of manufacturing a toroidal thrust chamber and injector assembly of a liquid propellant rocket engine, the method comprises essentially three steps which inferentially already have been set forth in part herein.

The first step is fabricating a plurality of arcuate segments, such as 10, 100A, 100B, 100C, 100D, 100E, 100F, 100G, 100H, 100J, and 100K, Fig. 4, of the toroidal thrust chamber and injector assembly 200, wherein each arcuate segment is identical to 10, FIGS. 1-4, and, of course, to each other. It is to be noted and emphasized that the segments are segments of a conventional toroidal thrust chamber and injector assembly.

The next step is affixing a baffle plate, such as 61, FIGS. 1-3, to each of the two vertical ends (such as first vertical end 18, FIGS. 1 and 3, and second vertical end 19, FIGS. 1, 3 and 4), of each of the plurality of identical arcuate segments, such as 10, FIGS. 1-4, with each baffle plate extending into the nozzle area (i.e., the supersonic gaseous flow area), such as 53, FIGS. 1 and 2, of the thrust chamber, such as 50, FIGS. 1 and 2, of the particular identical arcuate segment, such as 10, to which said baffle plate is affixed.

The third step is connecting together, in a removable manner, the plurality of identical adjacent arcuate segments (such as 10, 100A, 100B, 100C, 100D, 100E, 100F, 100G, 100H, 100J, and 100K, FIG. 4), with affixed end baffle plates (such as 61, FIGS. 1-3, and 62, FIG. 3, of segment 10, FIGS. 1-10), end-to-end (i.e., end baffle plate-to-end baffle plate). More specifically, each identical arcuate segment, such as 10, is removably connected by its second vertical end, and the baffle plate affixed thereto (such as second vertical end 19 of segment 10 with baffle plate 61 affixed thereto) to the first vertical end, and the baffle plate affixed thereto (such as first vertical end 118 of segment 100 with baffle plate 162, FIGS. 3 and 4, affixed thereto), of the next adjacent identical arcuate segment, such as 100, while maintaining coplanar relationship of the upper annular-like surface (such as surface 17C, FIGS. 1-4, and surface 117C, FIGS. 3 and 4) of each adjacent identical arcuate segment, until the entire toroidal thrust chamber and injector assembly, such as 200, FIG. 4, is formed.

MODE OF OPERATION OF THE PREFERRED EMBODIMENT

After my preferred embodiment of the toroidal thrust chamber and injector assembly, such as 200, FIG. 4, is manufactured as set out above, the assembly operates in the same way as any conventional toroidal thrust chamber and injector assembly. However, the performance of, and the results obtained by the use of, my assembly are new, useful, unexpected and unobvious. For example, the segmentation accelerates manufacture of the assembly, and permits easy and rapid removal and replacement of any of the identical arcuate segments; and, the supersonic baffle plates provide the much sought for circumferential stability of the rocket engine of which the assembly is a part. Other new, useful, unexpected and unobvious results are consistent with the above-stated objects of my invention, and need not be set forth or repeated here.

While there have been shown the fundamental features of my invention, it is to be understood that various substitutions, omissions and adaptations may be made by those of ordinary skill in the art without departing from the spirit of the invention.

What is claimed is:

1. A method of manufacturing a toroidal thrust chamber and injector assembly of a conventional liquid propellant rocket engine, comprising the steps of:
   a. fabricating a plurality of identical arcuate segments of a conventional toroidal thrust chamber and injector assembly of a conventional liquid propellant rocket engine, wherein each of said identical arcuate segments has a first vertical end and a second vertical end and an upper annular-like surface, and wherein each of said identical arcuate segments has formed therein a conventional toroidal thrust chamber which includes, downwardly from said upper annular-like surface, a combustion chamber and a nozzle area, with a throat therebetween;
   b. affixing a baffle plate to each end of each of said identical arcuate segments, with each said baffle plate extending downwardly from said upper annular-like surface and into the nozzle area of the toroidal thrust chamber of the arcuate segment to which said baffle plate is affixed;
   c. and, connecting together, in a removable manner, said plurality of identical arcuate segments having said affixed baffle plates, with the second vertical end and the baffle plate affixed thereto of each of said plurality of identical arcuate segments removably connected to the first vertical end and the baffle plate affixed thereto of the next adjacent identical arcuate segment, while maintaining coplanar relationship of the respective upper annular-like surface of each of the plurality of identical arcuate segments;
   whereby the toroidal thrust chamber and injector assembly of a liquid propellant rocket engine is formed.

2. A toroidal thrust chamber and injector assembly of a conventional liquid propellant rocket engine, comprising:
   a. a plurality of identical arcuate segments of a conventional toroidal thrust chamber and injector assembly of a conventional liquid propellant rocket engine, wherein each of said identical arcuate segments has a first vertical end and a second vertical end and an upper annular-like surface, and wherein each of said identical arcuate segments has formed therein a conventional toroidal thrust chamber which includes, downwardly from said upper annular-like surface, a combustion chamber and a nozzle area, with a throat therebetween;
   b. a baffle plate affixed to each end of each of said identical arcuate segments, with each said baffle plate extending downwardly from said upper annular-like surface and into the nozzle area of the toroidal thrust chamber of the arcuate segment to which said baffle plate is affixed;
   c. and, means for removably connecting together said plurality of identical arcuate segments having said affixed baffle plates, with the second vertical end and the baffle plate affixed thereto of each of said plurality of identical arcuate segments removably connected to the first vertical end and the baffle plate affixed thereto of the next adjacent segment, with the coplanar relationship of the respective annular-like surface of each of the plurality of identical arcuate segments being maintained.

* * * * *